No. 626,024. Patented May 30, 1899.
W. F. HOYT.
DISK DRILL.
(Application filed Feb. 17, 1899.)
(No Model.)
Fig. 2.
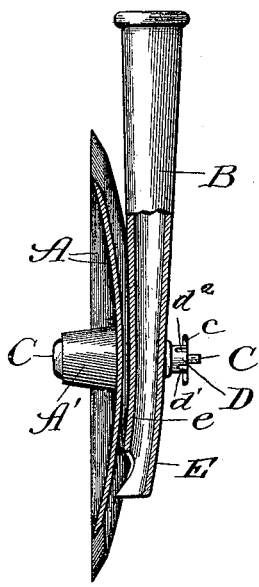
Fig. 1.
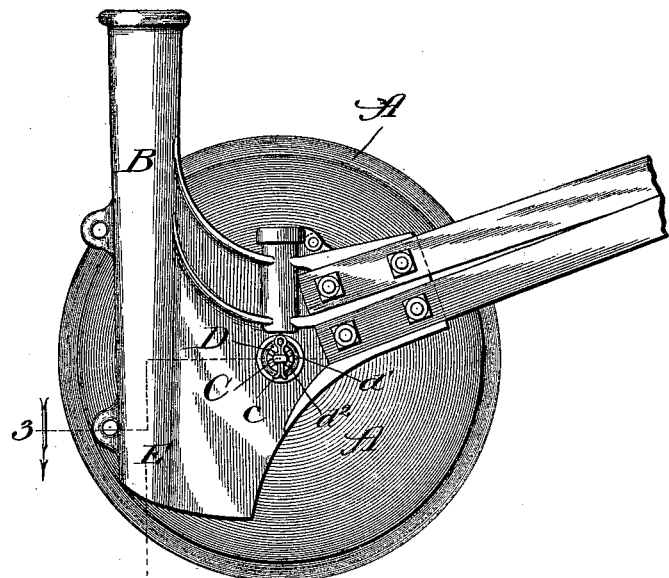
Fig. 3.
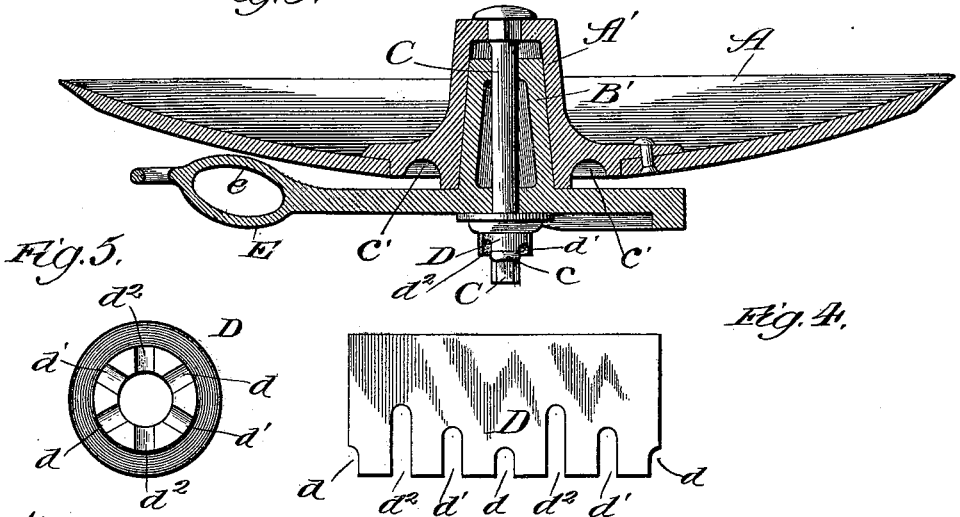
Fig. 5.
Fig. 4.
Witnesses:
Chas E Gaylord
Lute D Alto
Inventor:
Will F. Hoyt,
By Banning & Banning & Sheridan,
Atty's

UNITED STATES PATENT OFFICE.

WILL F. HOYT, OF DOWAGIAC, MICHIGAN.

DISK DRILL.

SPECIFICATION forming part of Letters Patent No. 626,024, dated May 30, 1899.

Application filed February 17, 1899. Serial No. 705,867. (No model.)

*To all whom it may concern:*

Be it known that I, WILL F. HOYT, a citizen of the United States, residing at Dowagiac, Michigan, have invented certain new and useful Improvements in Disk Drills, of which the following is a specification.

My improvement has particular reference to the bolt and washer that are used to attach the disk to the disk-frame and to the frame itself where the disk is attached; and my invention consists in the features and details of construction hereinafter described and claimed.

In the accompanying drawings, Figure 1 is a side elevation of a disk and a portion of the disk-frame to which it is attached; Fig. 2, a front vertical section taken on line 2 of Fig. 1; Fig. 3, a plan section taken on line 3 of Fig. 1; Fig. 4, a developed view of the take-up washer, and Fig. 5 a plan view of the same.

In making my improvement I make a disk A, provided with a hub A' of the usual construction, and attach it to a disk-frame B, provided with a spindle B' of the usual construction, through means of a bolt C. This bolt is provided with a hole near its end, adapted to receive a retaining-pin $c$. The bolt is of sufficient length after being inserted in place to receive a take-up washer D. This washer is provided with a number of diametrical grooves $d$, $d'$, and $d^2$ in its outer surface of unequal depth. This will be readily understood from an inspection of Fig. 4, which shows a developed view of the washer. When the parts are assembled together, the bolt is inserted in place to hold the disk and the disk-frame together, the take-up washer placed in position over its end, and the retaining-pin inserted through the hole in the end of the bolt. The parts are so proportioned that when they are first assembled the hole in the end of the bolt alines or registers with the shallowest one of the diametrical grooves $d$ in the outer end of the washer. This brings the parts into close relation and holds them as they are intended to be at the time the machine is finished ready for use. As the disk drill is used, however, wear will take place, so that gradually the disk will become loose in its attachment to the disk-frame and it will become necessary to take up the play by tightening the bolt. Where a nut is used, this is of course done by screwing up the nut; but with my improvement it is done by pulling out the retaining-pin, pushing the bolt fully in, and turning the take-up washer until the next deeper diametrical groove $d'$ alines or registers with the hole, when the retaining-pin is again inserted in place. This tightens the parts and removes the looseness or play that has been occasioned by the wear of the parts. The next time that it is necessary to shorten the bolt or tighten the parts the retaining-pin is arranged in the diametrical groove $d^2$. Any desired number of diametrical grooves may be employed and the same operation repeated until the retaining-pin rests in the deepest of the diametrical grooves. From what has been said, however, the arrangement of the take-up washer and other parts will be readily understood without further explanations in detail.

The axial hole in the outer end of the disk-hub is made square or angular, and the bolt C at its outer or head end is also made square or angular and so as to fit snugly into the hole, making a tight close joint to prevent the admission of dirt and grit to the bearing, and the inner end of the disk-hub has an annular recess or groove $c'$ therein adapted to receive a sand-band which may project therein from the frame to prevent the admission of dirt and grit at the inner end of the bearing. I have also obviated the weakness and objection that result in cutting away the inner wall of the spout E by giving the lower portion of the spout and of the disk-frame a curve similar to the curve of the disk itself, so that the lower ends of the frame and spout are turned to dip in under the central bulge or bowl of the disk. This brings the opening of the spout as near to the center of the furrow cut by the disk as possible, but without the impairment and weakness which result from cutting away the inner wall of the spout.

What I regard as new, and desire to secure by Letters Patent, is—

1. In a disk drill, the combination of a disk, a disk-frame, a bolt fastening the two together provided with a head at one end and a diametrical hole near the other end, a take-up washer provided with diametrical grooves of different depths, and a pin passing through the diametrical hole in the bolt when the same is brought into alinement or register with one of the diametrical grooves in the washer, substantially as described.

2. In a disk drill, the combination of a disk-frame, a disk having a hub provided on the face of its inner end with an annular recess or groove $c'$ adapted to receive a sand-band and an angular axial hole in its outer end, and a connecting-bolt angular at its outer end and having a close fit in the angular hole in the outer end of the disk-hub for preventing the admission of dust and grit, substantially as described.

WILL F. HOYT.

Witnesses:
   O. SCHMALZRIED,
   C. L. TOWLE.